United States Patent
He

(10) Patent No.: US 8,711,856 B2
(45) Date of Patent: Apr. 29, 2014

(54) METHOD AND DEVICE FOR PROCESSING BROADCAST PACKETS/MULTICAST CONTROL MESSAGES

(75) Inventor: Yuanling He, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 382 days.

(21) Appl. No.: 13/126,468

(22) PCT Filed: Apr. 28, 2010

(86) PCT No.: PCT/CN2010/072289
§ 371 (c)(1),
(2), (4) Date: Apr. 28, 2011

(87) PCT Pub. No.: WO2011/026335
PCT Pub. Date: Mar. 10, 2011

(65) Prior Publication Data
US 2011/0262138 A1   Oct. 27, 2011

(30) Foreign Application Priority Data
Sep. 1, 2009   (CN) .......................... 2009 1 0189850

(51) Int. Cl.
*H04L 12/28*   (2006.01)
(52) U.S. Cl.
USPC ............................................. 370/391; 398/66
(58) Field of Classification Search
None
See application file for complete search history.

(56) References Cited

U.S. PATENT DOCUMENTS

| | | | |
|---|---|---|---|
| 2005/0100036 A1* | 5/2005 | Davis | 370/432 |
| 2005/0243837 A1* | 11/2005 | Boyd et al. | 370/395.52 |
| 2006/0133809 A1* | 6/2006 | Chow et al. | 398/66 |
| 2007/0274339 A1* | 11/2007 | Kim et al. | 370/468 |
| 2009/0060507 A1* | 3/2009 | Effenberger et al. | 398/60 |
| 2010/0008379 A1* | 1/2010 | Yoo et al. | 370/468 |
| 2010/0174901 A1* | 7/2010 | Khermosh et al. | 713/160 |
| 2011/0142444 A1 | 6/2011 | Borges | |
| 2011/0176808 A1* | 7/2011 | He et al. | 398/58 |
| 2011/0217041 A1* | 9/2011 | Yoshida et al. | 398/58 |

FOREIGN PATENT DOCUMENTS

| | | |
|---|---|---|
| CN | 101094087 A | 12/2007 |
| CN | 101102210 A | 1/2008 |
| CN | 101188460 A | 5/2008 |
| CN | 101202591 A | 6/2008 |

(Continued)

OTHER PUBLICATIONS

Supplementary European Search Report in European application No. 10813257.2, mailed on Jan. 7, 2013.

(Continued)

*Primary Examiner* — Phirin Sam
(74) *Attorney, Agent, or Firm* — Oppedahl Patent Law Firm LLC

(57) ABSTRACT

The present invention discloses a method for processing broadcast packets/multicast control messages, comprising: replicating data to different broadcast/multicast logical channels in accordance with ONU types of users who join a VLAN when an OLT, on which a same port is connected to different types of ONUs, transmits the downlink broadcast packets/multicast control messages. The present invention also discloses a device for processing broadcast packets/multicast control messages. In accordance with the present invention, efficient processing of downlink broadcast packets and multicast control messages is realized when different types of ONUs coexist, unnecessary interference with ONUs from excessive data is avoided, and meanwhile the bandwidth between an OLT and an ONU can be utilized efficiently and meaningless bandwidth occupation by data streams can be avoided.

21 Claims, 5 Drawing Sheets

(56) References Cited

FOREIGN PATENT DOCUMENTS

| | | |
|---|---|---|
| CN | 101227752 A | 7/2008 |
| CN | 101414955 A | 4/2009 |
| CN | 101621461 A | 1/2010 |
| EP | 2117167 A1 | 11/2009 |
| EP | 2320598 A1 | 5/2011 |
| JP | 2007288655 A | 11/2007 |
| JP | 200914574 A | 6/2009 |

OTHER PUBLICATIONS

International Search Report on international application No. PCT/CN2010/072289, mailed on Aug. 5, 2010.
English Translation of the Written Opinion of the International Search Authority in international application No. PCT/CN2010/072289, mailed on Aug. 5, 2010.

\* cited by examiner

METHOD AND DEVICE FOR PROCESSING BROADCAST PACKETS/MULTICAST CONTROL MESSAGES

TECHNICAL FIELD

The present invention relates to the technical field of PON, particularly to a method and device for processing broadcast packets/multicast control messages.

BACKGROUND

A PON (Passive Optical Network) system is generally composed of an office-side OLT (Optical Line Terminal), a user-side ONU (Optical Network Unit)/ONT (Optical Network Termination) and an ODN (Optical Distribution Network). The ODN consists of single-mode optical fibers, optical splitters, optical connectors and other passive optical components and provides an optical transmission medium for the physical connection between the OLT and the ONU. The ODN generally adopts a point-to-multipoint structure, i.e. an OLT is connected to multiple ONUs via an ODN.

An EPON (Ethernet Passive Optical Network) is a new-generation broadband passive optical integrated access technology based on IEEE (Institute of Electrical and Electronics Engineers) 802.3-2005 Section 5 and IEEE802.3av standards.

For the EPON, the IEEE standards only define the standards of physical layers and link layers of a 1G-EPON and a 100-EPON and do not involve other service functions. For multicast, the IEEE802.3-2005 Section 5 standard defines the identification of a broadcast logical channel in the 1G-EPON as 0×7fff; the IEEE802.3av standard defines the identification of a broadcast logical channel in the 10G-EPON as 0×7ffe. Generally, when an OLT in the EPON transmits a broadcast and multicast message, it may transmit data to all ports under a PON port by using a broadcast logical channel; then the ONU determines a port to which the broadcast and multicast message will be forwarded in accordance with a locally saved table illustrating correspondences between a multicast group and local user interfaces.

The above is mainly for the circumstance that only the same type of ONUs are connected to a same port on the OLT.

FIG. 1 is a schematic diagram of networking in the prior art when 1G-EPONs and 10G-EPONs coexist. As shown in FIG. 1, there are 3 ONUs under optical splitter 1 connected to port 1 of an OLT, wherein ONU A and ONU B are 1G-EPON ONUs, and ONU C is a 10G-EPON ONU. When ONUs at different rates are connected to a same port of a same OLT, the existing standards do not have the provisions on how an OLT uses a broadcast or multicast logical channel to transmit downlink broadcast packets and multicast control messages, so how to efficiently utilize a physical channel in a PON to realize the forwarding of downlink broadcast packets and multicast control messages is a problem to be solved.

SUMMARY

For this reason, the main object of the present invention is to provide a method and device for processing broadcast packets/multicast control messages to realize the processing of downlink broadcast packets/multicast control messages when different types of ONUs coexist.

To achieve the foregoing object, the technical solution of the present invention is realized in the following way:

The present invention provides a method for processing broadcast is packets/multicast control messages, comprising: replicating data to different broadcast/multicast logical channels in accordance with the ONU types of users who join a virtual local area network (VLAN) when an OLT, on which a same port is connected to different types of ONUs, transmits a downlink broadcast packet/multicast control message.

The replicating data to different broadcast/multicast logical channels in accordance with the ONU types of users who join a VLAN may be that:

if there only exist the same ONU type of users belonging to the VLAN under an OLT port to which the VLAN corresponds, transmitting the broadcast packet/multicast control message through a broadcast/multicast logical channel to which this ONU type corresponds.

The replicating data to different broadcast/multicast logical channels in accordance with the ONU types of users who join a VLAN may be that:

if there coexist different ONU types of users belonging to the VLAN under an OLT port to which the VLAN corresponds, transmitting one broadcast packet/multicast control message respectively to ONUs under the OLT port through broadcast/multicast logical channels to which these ONU types each correspond.

The ONU types may be classified by rate.

This method may further comprise: after receiving the downlink broadcast packet/multicast control message, the ONU transmits the broadcast packet/multicast control message to all ports that belong to the VLAN in accordance with correspondences, established in the ONU, between the VLAN and user ports.

The OLT may determine users who join the VLAN and their respective ONU types in accordance with established information entries.

The information entries may include: a correspondence between an ONU logical link identification and an ONU type, a correspondence between an ONU logical link identification and an OLT port, a correspondence between a VLAN and an ONU logical link identification and a correspondence between a VLAN and an OLT port.

The present invention also discloses a device for processing broadcast packets/multicast control messages, which is applied to an OLT on which a same port is connected to different types of ONUs, comprising:

a data receiving module, used to receive a downlink broadcast packet/multicast control message; and a data replicating module, used to replicate, in accordance with the ONU types of users who join a VLAN, the broadcast packet/multicast control message received by the data receiving module to different broadcast/multicast logical channels during forwarding of downlink broadcast packets/multicast control messages.

The data replicating module replicates the broadcast packet/multicast control message received by the data receiving module to different broadcast/multicast logical channels, specifically: if there only exist the same ONU type of users belonging to the VLAN under an OLT port that belongs to the VLAN, the data replicating module transmits the broadcast packet/multicast control message through a broadcast/multicast logical channel to which this ONU type corresponds.

The data replicating module replicates the broadcast packet/multicast control message received by the data receiving module to different broadcast/multicast logical channels, specifically: if there coexist different ONU types of users belonging to the VLAN under an OLT port that belongs to the VLAN, the data replicating module transmits one broadcast packet/multicast control message respectively to ONUs under the OLT port through broadcast/multicast logical channels to which these ONU types each correspond.

The ONU types may be classified by rate.

This device may further comprise an entry establishing module, used to establish information entries.

The data replicating module may also be used to determine users who join the VLAN and their respective ONU types in accordance with the established information entries.

The information entries established by the entry establishing module may include: a correspondence between an ONU logical link identification and an ONU type, a correspondence between an ONU logical link identification and an OLT port, a correspondence between a VLAN and an ONU logical link identification and a correspondence between a VLAN and an OLT port.

The present invention discloses a method and device for processing broadcast packets/multicast control messages, replicating data to different broadcast/multicast logical channels in accordance with the ONU types of users who join a VLAN when an OLT, on which a same port is connected to different types of ONUs, transmits downlink broadcast packets/multicast control messages. Through the method and device of the present invention, efficient processing of downlink broadcast packets and multicast control messages are realized when different types of ONUs coexist, an ONU can identify whether the data belong to an ONU of its type before forwarding and processing of downlink broadcast packets and downlink multicast control messages, and unnecessary interference with the ONU from excessive data can be avoided; meanwhile the bandwidth between an OLT and an ONU can be utilized efficiently and meaningless bandwidth occupation by data streams can be avoided.

DETAILED DESCRIPTION

Below the technical solution of the present invention will be described in details in combination with drawings and embodiments.

Figure 1:
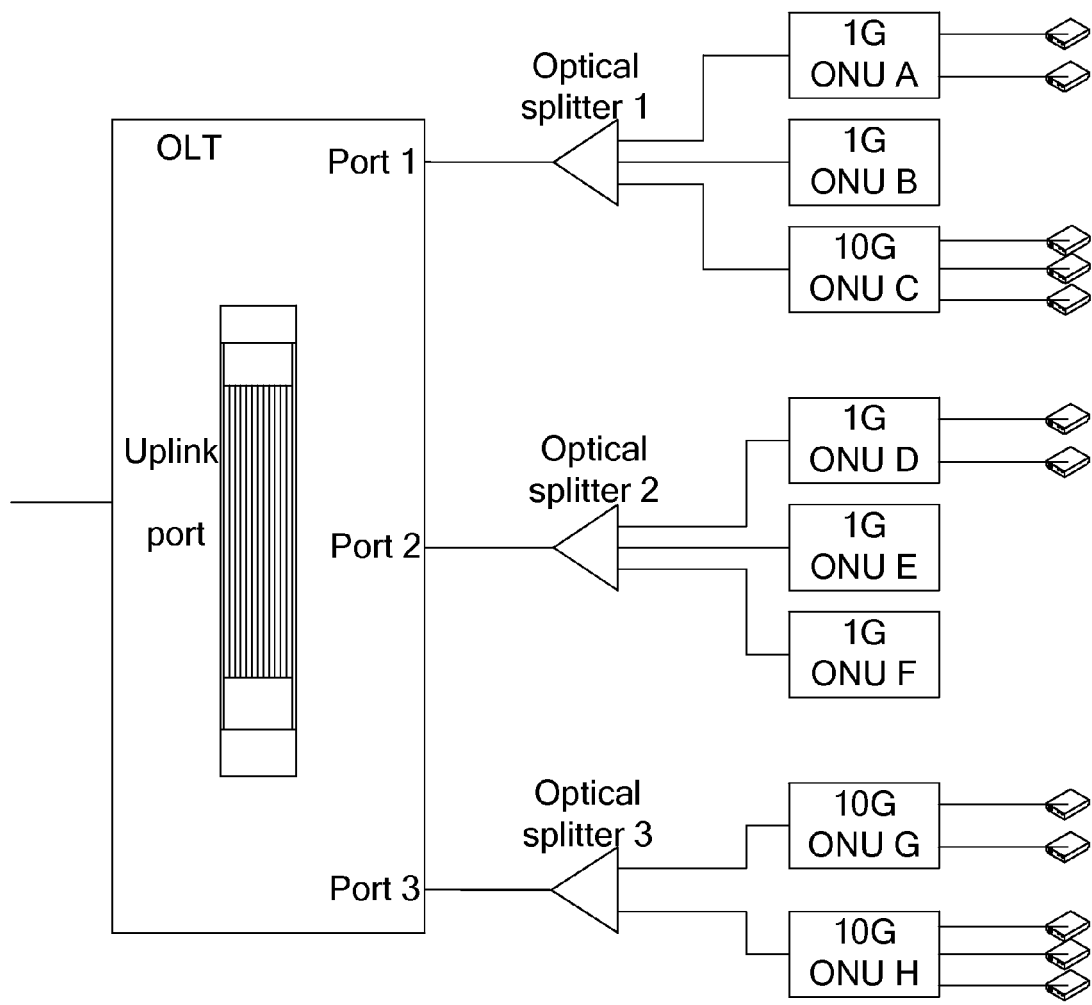
FIG. 1 is a schematic diagram of networking in the prior art when 1G-EPONs and 10G-EPONs coexist.
Figure 2:
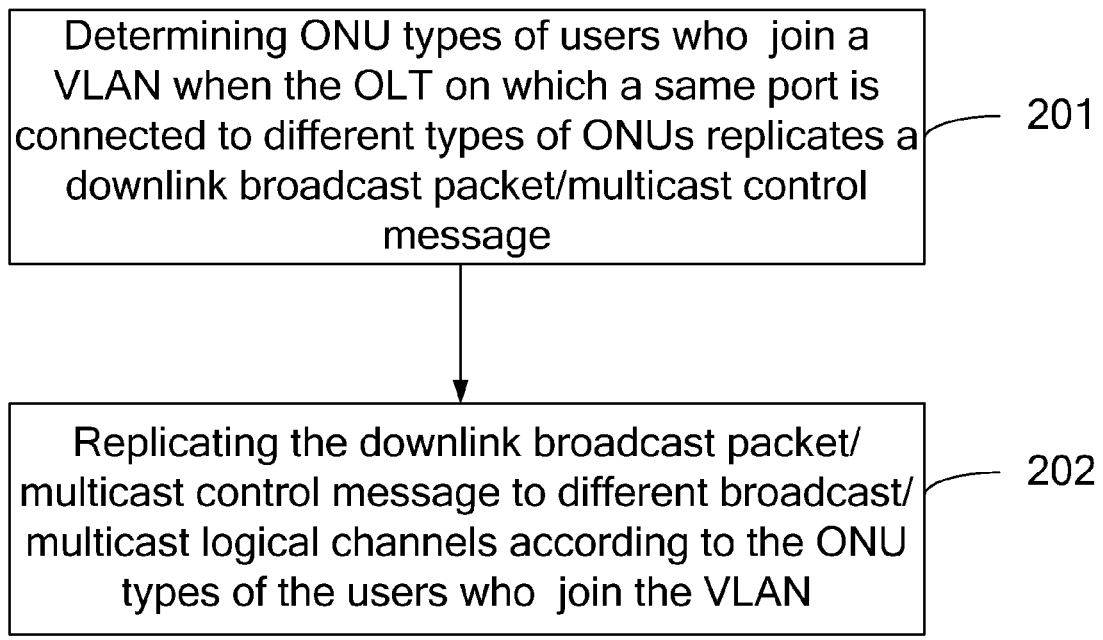
FIG. 2 is a flow chart of a method for processing broadcast packets/multicast control messages of the present invention.

FIG. 2 is a flow chart of a method for processing broadcast packets/multicast control messages of the present invention. As shown in FIG. 2, the method mainly comprises the following steps.

201: The ONU types of users who join a VLAN are determined when an OLT, on which a same port is connected to different types of ONUs, forwards a downlink broadcast packet/multicast control message.

The ONU types may be classified by rate, for example: in an EPON, the ONU types are classified into a 1G-EPON ONU type and a 10G-EPON ONU type by rate. Of course, the present invention is not limited to the classification by rate, and the basis of classification of the ONU types may be extended in accordance with an actual need.

The VLAN may be acquired by the following method: if the downlink broadcast packet/multicast control message is a data packet with a tag, then the OLT determines a multicast VLAN in accordance with the VLAN tag carried by the data packet; if the downlink broadcast packet/multicast control message is a data packet without a tag, then the OLT regards the multicast VLAN as a default VLAN considered by a port on the OLT network side.

202: The OLT replicates the downlink broadcast packet/multicast control message to different broadcast/multicast logical channels in accordance with the ONU types of the users who join the VLAN.

Specifically, if there only exist the same ONU type of users belonging to the VLAN under a certain OLT port to which the VLAN corresponds, the downlink broadcast packet/multicast control message is transmitted through a broadcast/multicast logical channel to which this ONU type corresponds, specifically, it is transmitted to ONUs under the OLT port; if there coexist different ONU types of users belonging to the VLAN under a certain OLT port to which the VLAN corresponds, the broadcast packet/multicast control message is transmitted respectively to ONUs under the OLT port through broadcast/multicast logical channels to which these ONU types each correspond.

Based on the foregoing method for processing broadcast packets/multicast control messages, in a practical application, when the OLT receives downlink broadcast packet/multicast control message data, it may determine the users who belong to the VLAN and their respective ONU types as well as the OLT port for transmitting multicast data in accordance with various established information entries, thereby determining whether there exist different ONU types of users under each OLT port to which the VLAN corresponds.

Preferably, the information entries may include: a correspondence between an ONU logical link identification and an ONU type, a correspondence between an ONU logical link identification and an OLT port, a correspondence between a VLAN and an ONU logical link identification and a correspondence between a VLAN and an OLT port, etc. The correspondence between a VLAN and an OLT port may be set through a network administrator. The correspondence between a VLAN and an ONU logical link identification may be set through a network administrator or generated by the OLT in accordance with the correspondence between a VLAN and an OLT port and the correspondence between an ONU logical link identification and an OLT port.

The OLT searches for correspondences between the VLAN and OLT ports and obtains OLT ports to which the VLAN corresponds; then, the OLT determines the users who belong to the VLAN, their respective ONU types and ONU logical link identifications in accordance with correspondences between the VLAN and ONU logical link identifications, correspondences between ONU logical link identifications and OLT ports and correspondences between ONU logical link identifications and the ONU types; and the OLT further judges whether there exist different ONU types of users belonging to the VLAN under each OLT port. If it is determined that there are only the same ONU type of users belonging to the VLAN under a certain OLT port, then the OLT transmits the downlink broadcast packet/multicast control message to ONUs under this OLT port through a broadcast/multicast logical channel to which this ONU type corresponds. If it is determined that there coexist different ONU types of users belonging to the VLAN under a certain OLT port to which the VLAN corresponds, then the OLT transmits one downlink broadcast packet/multicast control message to ONUs under this OLT port respectively through broadcast/multicast logical channels to which these ONU type each correspond.

Taking classifying ONU types into a 1G-EPON ONU type and a 10G-EPON ONU type for example, if the OLT determines that there are only users of the 1G-EPON ONU type belonging to the VLAN under a certain port, then it transmits the downlink broadcast packet/multicast control message to ONUs under this OLT port through a broadcast logical channel (marked with 0x7fff) to which the 1G-EPON ONU type corresponds; if the OLT determines that there are only users of the 10G-EPON ONU type belonging to the VLAN under a certain port, then it transmits the downlink broadcast packet/ multicast control message to ONUs under this OLT port through a broadcast logical channel (marked with 0x7ffe) to which the 10G-EPON ONU type corresponds; if the OLT determines that there coexist both the users of the 1G-EPON ONU type and those of the 10G-EPON ONU type belonging to the VLAN under a is certain port, then it transmits the downlink broadcast packet/multicast control message through the broadcast logical channel (marked with 0x7fff) to which the 1G-EPON ONU type corresponds and the broadcast logical channel (marked with 0x7ffe) to which the 10G-EPON ONU type corresponds, respectively. Through the two transmissions, it can be guaranteed that both 1G-EPON ONUs and 10G-EPON ONUs under this OLT port can receive the downlink broadcast packet/multicast control message.

Below the foregoing method for processing broadcast packets/multicast control messages is further described in details by taking the processing of downlink broadcast packets/multicast control messages in an EPON for example. However, the method for processing broadcast packets/multicast control messages of the present invention is not limited to the EPON only and is also applicable for other types of PONs.

In Embodiment 1 of the present invention, the processing of downlink broadcast packets in an EPON is described in details. VLAN entries are required to be established in the OLT and are used to determine OLT ports. In addition, other correspondences are required to be established to determine the users who belong to the VLAN and their respective ONU types. The specific operation for establishing the VLAN entries and other correspondences (all belong to information entries) is as follows:

1. establishing a correspondence between an ONU logical link identification and an ONU type (recorded as correspondence 1) in the OLT, for identifying ONU logical link identifications to which the 1G-EPON corresponds and ONU logical link identifications to which the 10G-EPON corresponds;

2. establishing a correspondence between an OLT port and an ONU logical link identification (recorded as correspondence 2) in the OLT during ONU registration;

3. establishing a correspondence between the VLAN and an ONU logical link identification (recorded as correspondence 3) and a correspondence between the VLAN and an OLT port (recorded as correspondence 4) in accordance with network administrator's configuration;

4. establishing a correspondence between the VLAN and an ONU user port (recorded as correspondence 5) on the ONU in accordance with network administrator's configuration.

Figure 3:
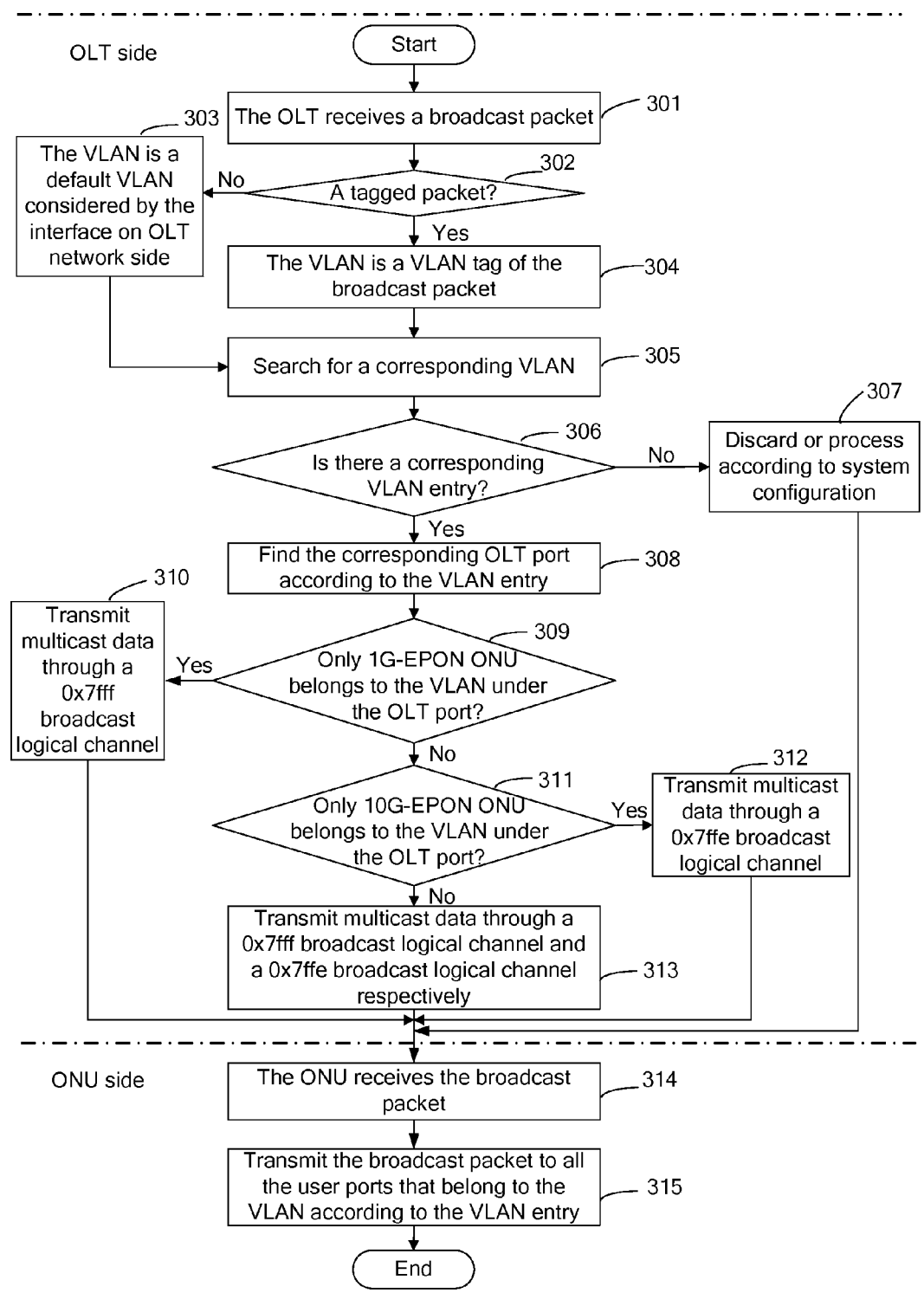
FIG. 3 is a flow chart of a method for processing downlink broadcast packets in Embodiment 1 of the present invention.

The method for processing downlink broadcast packets implemented on the basis of the foregoing information entries is shown in FIG. 3, and mainly includes the following steps.

301: The OLT receives a broadcast packet through its own uplink port.

302~306: If the broadcast packet carries a tag, then the OLT searches for a VLAN entry corresponding to this VLAN tag in accordance with the VLAN tag carried in the broadcast packet. If the broadcast packet does not carry a tag, then the OLT searches for a VLAN entry to which a default VLAN considered by an interface on the OLT network side corresponds. If found, then S308 is executed; if not found, then S307 is executed.

307: If the OLT does not find the VLAN entry corresponding to the VLAN, then the broadcast packet is discarded or processed in accordance with system configuration. And The whole flow is terminated after the execution of the operation is completed.

308: If the OLT finds the VLAN entry corresponding to the VLAN, then it finds the OLT port corresponding to this multicast group in accordance with the established VLAN entry (correspondence 4).

309: Whether there only exist 1G-EPON ONUs belonging to this VLAN under this OLT port is judged; if yes, then S310 is executed; if not, then S311 is executed.

ONU logical link identifications belonging to this VLAN under each OLT port are searched for in accordance with the correspondence 2 and the correspondence 3, and whether there only exist 1G-EPON ONUs belonging to this VLAN is judged based on the search result and the correspondence 1.

310: If it is determined that there only exist 1G-EPON ONUs belonging to this VLAN under the OLT port, then the broadcast packet is transmitted to the ONUs under this OLT port through a 0x7fff broadcast logical channel.

311: Whether there only exist 10G-EPON ONUs belonging to this VLAN under this OLT port is judged; if yes, then S312 is executed; if not, then S313 is executed.

ONU logical link identifications belonging to this VLAN under each OLT port are searched for in accordance with the correspondence 2 and the correspondence 3, and whether there only exist 10G-EPON ONUs belonging to this VLAN is judged based on the search result and the correspondence 1.

312: If it is determined that there only exist 10G-EPON ONUs belonging to this VLAN under the OLT port, then the broadcast packet is transmitted to ONUs under this OLT port through a 0x7ffe broadcast logical channel.

313: It is determined that there coexist both 1G-EPON ONUs and 10G-EPON ONUs belonging to this VLAN under this OLT port, then one broadcast packet is transmitted to ONUs under this OLT port through the 0x7fff broadcast logical channel and the 0x7ffe broadcast logical channel, respectively.

It should be noted that Step 301 to Step 313 are executed on the OLT side.

314: The ONU receives the broadcast packet via a PON interface.

315: The ONU transmits the broadcast packet to all user ports that belong to this VLAN in accordance with the correspondence 5.

It should be noted that Step 314 and Step 315 are executed on the ONU side.

In Embodiment 2 of the present invention, the EPON system adopts a realization method of the IGMP. Multicast VLAN entries are required to be established in the OLT and are used to determine OLT ports. In addition, other correspondences are required to be established to determine the users who belong to the multicast VLAN and their respective ONU types. The specific operation for establishing the multicast VLAN entries and other correspondences (all belong to information entries) is as follows:

1. establishing a correspondence between an ONU logical link identification and an ONU type (recorded as correspondence 1) in the OLT, for identifying ONU logical link identifications to which the 1G-EPON corresponds and those to which the 10G-EPON corresponds;

2. establishing a correspondence between an OLT port and an ONU logical link identification (recorded as correspondence 2) in the OLT during ONU registration;

3. establishing a correspondence between a multicast VLAN and an ONU logical link identification (recorded as correspondence 3) and a correspondence between a multicast VLAN and an OLT port (recorded as correspondence 4) in accordance with network administrator's configuration; and 4. establishing a correspondence between a multicast VLAN and an ONU user port (recorded as correspondence 5) on the ONU in accordance with network administrator's configuration.

Figure 4:
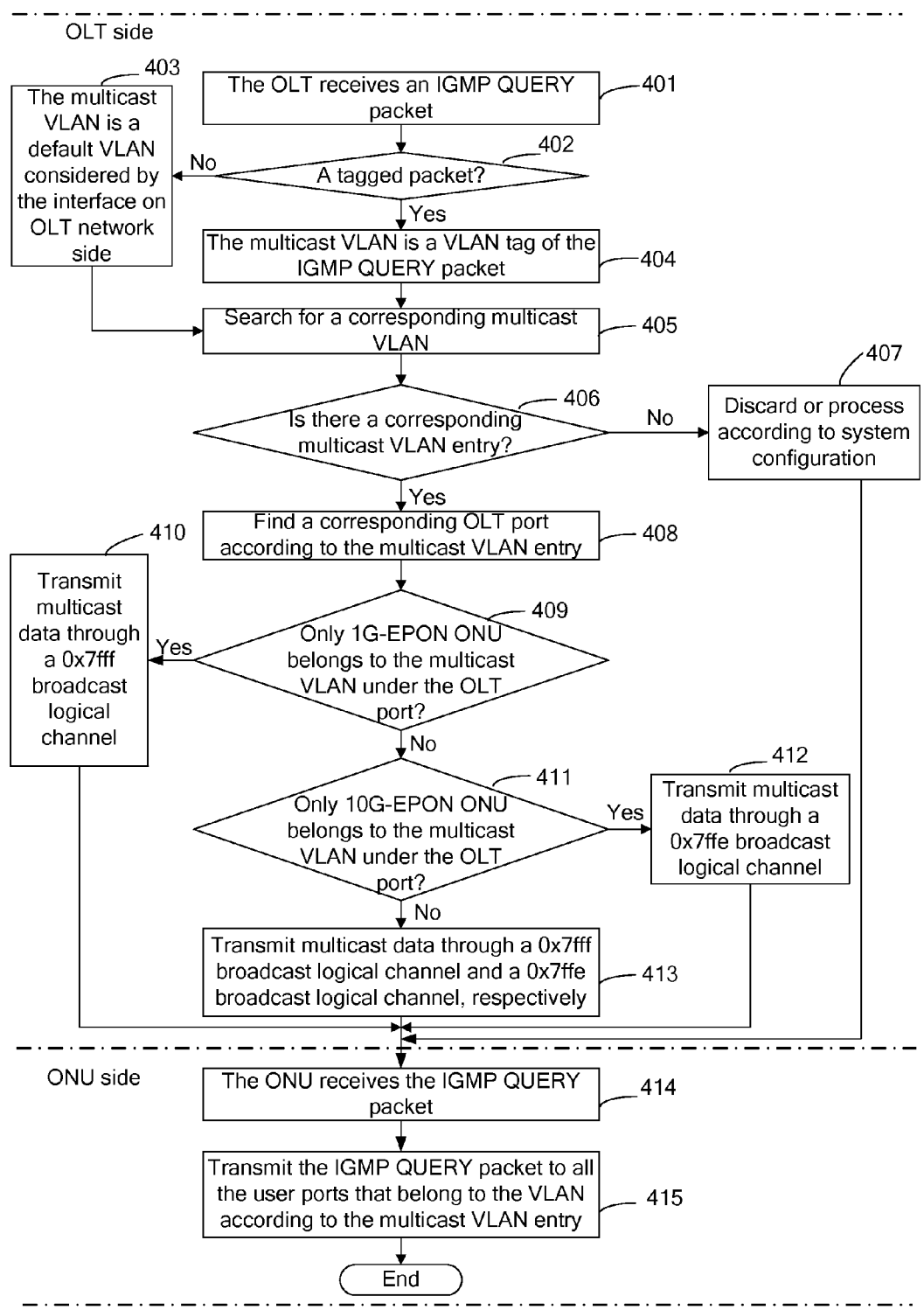
FIG. 4 is a flow chart of a method for processing downlink multicast control messages in Embodiment 2 of the present invention.

The method for processing downlink multicast control messages realized on the basis of the foregoing information entries is shown in FIG. 4, and mainly includes the following steps.

401: The OLT receives an IGMP QUERY packet through its own uplink port.

402~406: If the IGMP QUERY packet carries a tag, then the OLT searches for a multicast VLAN entry corresponding to this VLAN tag in accordance with the VLAN tag carried in the QUERY packet. If the IGMP QUERY packet does not carry a tag, then the OLT searches for a multicast VLAN entry to which a default VLAN considered by an interface on the OLT network side corresponds. If found, then S408 is executed; if not found, then S407 is executed.

407: If the OLT does not find the multicast VLAN entry corresponding to the multicast VLAN, then the IGMP QUERY packet is discarded or processed in accordance with system configuration. And The whole flow is terminated after the execution of the operation is completed.

408: If the OLT finds the multicast VLAN entry corresponding to this VLAN, then it finds out the OLT port corresponding to this multicast group in accordance with the established multicast VLAN entry (correspondence 4).

409: Whether there only exist 1G-EPON ONUs belonging to this multicast VLAN under this OLT port is judged. If yes, then S410 is executed; if not, then S411 is executed.

ONU logical link identifications belonging to this multicast VLAN under each OLT port are searched for in accordance with the correspondence 2 and the correspondence 3, and whether there only exist 1G-EPON ONUs belonging to this multicast VLAN is judged based on the search result and the correspondence 1.

410: If it is determined that there only exist 1G-EPON ONUs belonging to this multicast VLAN under the OLT port, then the IGMP QUERY packet is transmitted to the ONUs under this OLT port through a 0×7fff broadcast logical channel.

411: Whether there only exist 10G-EPON ONUs belonging to this multicast VLAN under this OLT port is judged; if yes, then S412 is executed; if not, then S413 is executed.

ONU logical link identifications belonging to this multicast VLAN under each OLT port are searched for in accordance with the correspondence 2 and the correspondence 3, and whether there only exist 10G-EPON ONUs belonging to this multicast VLAN is judged based on the search result and the correspondence 1.

412: If it is determined that there only exist 10G-EPON ONUs belonging to this multicast VLAN under the OLT port, then the IGMP QUERY packet is transmitted to the ONUs under this OLT port through a 0×7ffe broadcast logical channel.

413: It is determined that there coexist both 1G-EPON ONUs and 10G-EPON ONUs belonging to this multicast VLAN under this OLT port, then one IGMP QUERY packet is transmitted to ONUs under this OLT port through a 0×7fff broadcast logical channel and a 0×7ffe broadcast logical channel, respectively.

414: The ONU receives the IGMP QUERY packet via a PON interface.

415: The ONU transmits the IGMP QUERY packet to all the user ports that belong to this multicast VLAN in accordance with the correspondence 5.

It should be noted that the correspondence between an ONU logical link identification and an ONU type in the OLT may be determined by, but not limited to, the following two methods.

Method 1: Configuring the correspondence in accordance with a value range of an ONU logical link identification; provided that it is a 1G-EPON ONU if the value of an ONU logical link identification is in a certain range, while it is a 10G-EPON ONU if the value is in another certain range.

For example: it is a 1G-EPON ONU if the value of an ONU logical link identification is greater than or equal to 0 and smaller than or equal to 64, while it is a 100-EPON ONU if the value of an ONU logical link identification is greater than or equal to 65 and smaller than or equal to 511. Or, it is a 1G-EPON ONU if the value of an ONU logical link identification is greater than or equal to 0 and smaller than or equal to 2047, while it is a 10G-EPON ONU if the value of an ONU logical link identification is greater than or equal to 2048 and smaller than or equal to 4095.

Method 2: Determining the correspondence dynamically in accordance with system configuration or ONU registration; saving the correspondence between an ONU logical link identification and an ONU type in the OLT, marking the ONU logical link identifications to which the 1G-EPON ONU corresponds and the ONU logical link identifications to which the 10G-EPON ONU corresponds, and performing update or manual configuration during ONU registration.

Figure 5:
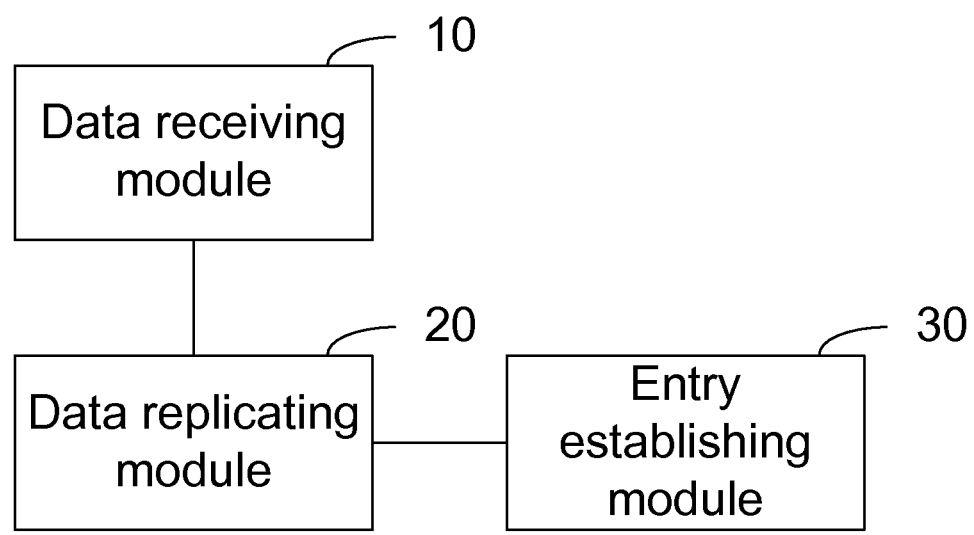
FIG. 5 is a schematic diagram of the composition and structure of a device for processing broadcast packets/multicast control messages of the present invention.

To implement the foregoing method for processing broadcast packets/multicast is control messages, the present invention also provides a device for processing broadcast packets/multicast control messages. This device is applicable for an OLT on which a same port is connected to different types of ONUs, as shown in FIG. 5. The device comprises: a data receiving module 10 and a data replicating module 20; wherein the data receiving module 10 is used to receive a downlink broadcast packet/multicast control message; and the data replicating module 20 is used to replicate the downlink broadcast packet/multicast control message to different broadcast/multicast logical channels in accordance with the ONU types of the users who join a VLAN during forwarding of the downlink broadcast packet/multicast control message.

Preferably, the data replicating module 20 is further used to, when there are only the same ONU type of users belonging to this VLAN under an OLT port to which the VLAN corresponds, transmit multicast data to ONUs under the OLT port through a broadcast/multicast logical channel to which this ONU type corresponds and, when there coexist different ONU types of users belonging to this VLAN under a certain OLT port to which the VLAN corresponds, transmit one broadcast packet/multicast control message to ONUs under the OLT port respectively through broadcast/multicast logical channels to which these ONU types each correspond.

The ONU types may be classified by rate, for example: in the EPON, the ONU types are classified into a 1G-EPON ONU type and a 10G-EPON ONU type by rate.

Preferably, on the basis of the foregoing modules, this device further comprises an entry establishing module 30, used to establish information entries. The information entries may include: a correspondence between an ONU logical link identification and an ONU type, a correspondence between an ONU logical link identification and an OLT port, a correspondence between a VLAN and an ONU logical link identification, a correspondence between a VLAN and an OLT port and so on and so forth; and accordingly, the data replicating module 20 is further used to determine the users who belong to the VLAN and their respective ONU types in accordance with the established information entries.

To summarize, through the method and device of the present invention, efficient processing of downlink broadcast packets and multicast control messages are realized when different types of ONUs coexist, an ONU can identify whether data belong to an ONU of its type before processing of downlink broadcast packets and downlink multicast control messages, and unnecessary interference with the ONU from excessive data can be avoided; meanwhile the bandwidth between an OLT and an ONU can be utilized efficiently and meaningless bandwidth occupation by data streams can be avoided.

The above is the description of the preferred embodiments of the present invention and is not to limit the scope of the present invention.

What is claimed is:

1. A method for processing broadcast packets/multicast control messages, comprising:
    establishing information entries in an optical line terminal (OLT);
    finding a virtual local area network (VLAN) entry corresponding to a VLAN tag carried in the broadcast packets/multicast control messages according to the information entries when the OLT receives the downlink broadcast packet/multicast control message data;
    determining OLT ports corresponding to the VLAN according to the VLAN entry and determining optical network units (ONUs) types of users who join the VLAN under a same OLT port;
    replicating data to different broadcast/multicast logical channels in accordance with ONU types of users who join the VLAN under the same OLT port when transmitting of the downlink broadcast packet/multicast control message by determined OLT ports.

2. The method of claim 1, wherein the replicating data to different broadcast/multicast logical channels in accordance with ONU types of users who join a VLAN is that:
    if there only exist the same ONU type of users belonging to the VLAN under an OLT port to which the VLAN corresponds, transmitting the broadcast packet/multicast control message through a broadcast/multicast logical channel to which this ONU type corresponds.

3. The method of claim 2, wherein the ONU types are classified by rate.

4. The method of claim 2, further comprising: after the ONU receives the downlink broadcast packet/multicast control message, transmitting the broadcast packet/multicast control message to all ports that belong to the VLAN in accordance with correspondences, established in the ONU, between the VLAN and user ports.

5. The method of claim 1, wherein the replicating data to different broadcast/multicast logical channels in accordance with the ONU types of users who join a VLAN is that:
    if there coexist different ONU types of users belonging to the VLAN under an OLT port to which the VLAN corresponds, transmitting one broadcast packet/multicast control message respectively to ONUs under the OLT port through broadcast/multicast logical channels to which these ONU types each correspond.

6. The method of claim 5, wherein the ONU types are classified by rate.

7. The method of claim 5, further comprising: after the ONU receives the downlink broadcast packet/multicast control message, transmitting the broadcast packet/multicast control message to all ports that belong to the VLAN in accordance with correspondences, established in the ONU, between the VLAN and user ports.

8. The method of claim 1, wherein the ONU types are classified by rate.

9. The method of claim 1, further comprising: after the ONU receives the downlink broadcast packet/multicast control message, transmitting the broadcast packet/multicast control message to all ports that belong to the VLAN in accordance with correspondences, established in the ONU, between the VLAN and user ports.

10. The method of claim 1, wherein the information entries include: a correspondence between an ONU logical link identification and an ONU type, a correspondence between an ONU logical link identification and an OLT port, a correspondence between a VLAN and an ONU logical link identification and a correspondence between a VLAN and an OLT port.

11. The method of claim 1, wherein the information entries include: a correspondence between an ONU logical link identification and an ONU type, a correspondence between an ONU logical link identification and an OLT port, a correspondence between a VLAN and an ONU logical link identification and a correspondence between a VLAN and an OLT port.

12. The method of claim 1, wherein the information entries include: a correspondence between an ONU logical link identification and an ONU type, a correspondence between an ONU logical link identification and an OLT port, a correspondence between a VLAN and an ONU logical link identification and a correspondence between a VLAN and an OLT port.

13. A device for processing broadcast packets/multicast control messages, applied to an optical line terminal (OLT) on which a same port is connected to different types of optical network units (ONUs), comprising:
    an entry establishing module, configured to establish information entries in the OLT;
    a data receiving module, configured to receive a downlink broadcast packet/multicast control message; and
    a data replicating module, configured to establish information entries in an optical line terminal (OLT);
    find a virtual local area network (VLAN) entry corresponding to a VLAN tag carried in the broadcast packets/multicast control messages according to the information entries when the OLT receives the downlink broadcast packet/multicast control message data;
    determine OLT ports corresponding to the VLAN according to the VLAN entry and determine optical network units (ONUs) types of users who join the VLAN under a same OLT port;
    replicate the broadcast packet/multicast control message received by the data receiving module to different broadcast/multicast logical channels in accordance with the ONU types of users who join the VLAN under the same OLT port during forwarding of downlink broadcast packets/multicast control messages by determined OLT ports.

14. The device of claim 13, wherein the data replicating module replicates the broadcast packet/multicast control message received by the data receiving module to different broadcast/multicast logical channels, specifically: if there only exist the same ONU type of users belonging to the VLAN under an OLT port that belongs to the VLAN, the data replicating module transmits the broadcast packet/multicast control message through a broadcast/multicast logical channel to which this ONU type corresponds.

15. The device of claim 14, wherein the ONU types are classified by rate.

16. The device of claim 13, wherein the data replicating module replicates the broadcast packet/multicast control message received by the data receiving module to different broadcast/multicast logical channels, specifically: if different ONU types of users belonging to the VLAN coexist under an OLT port that belongs to the VLAN, the data replicating module transmits one broadcast packet/multicast control message respectively to ONUs under the OLT port through broadcast/multicast logical channels to which these ONU types each correspond.

17. The device of claim 16, wherein the ONU types are classified by rate.

18. The device of claim 13, wherein the ONU types are classified by rate.

19. The device of claim 13, wherein the information entries established by the entry establishing module include: a correspondence between an ONU logical link identification and an ONU type, a correspondence between an ONU logical link identification and an OLT port, a correspondence between a VLAN and an ONU logical link identification and a correspondence between a VLAN and an OLT port.

20. The device of claim 13, wherein the information entries established by the entry establishing module include: a correspondence between an ONU logical link identification and an ONU type, a correspondence between an ONU logical link identification and an OLT port, a correspondence between a VLAN and an ONU logical link identification and a correspondence between a VLAN and an OLT port.

21. The device of claim 13, wherein the information entries established by the entry establishing module include: a correspondence between an ONU logical link identification and an ONU type, a correspondence between an ONU logical link identification and an OLT port, a correspondence between a VLAN and an ONU logical link identification and a correspondence between a VLAN and an OLT port.

* * * * *

UNITED STATES PATENT AND TRADEMARK OFFICE
CERTIFICATE OF CORRECTION

PATENT NO.         : 8,711,856 B2                                              Page 1 of 1
APPLICATION NO. : 13/126468
DATED              : April 29, 2014
INVENTOR(S)        : Yuanling He It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 325 days.

Signed and Sealed this
Twenty-ninth Day of September, 2015

Michelle K. Lee
*Director of the United States Patent and Trademark Office*